United States Patent [19]

Payne et al.

[11] Patent Number: 5,663,972
[45] Date of Patent: Sep. 2, 1997

[54] ULTRAFAST PULSED LASER UTILIZING BROAD BANDWIDTH LASER GLASS

[75] Inventors: Stephen A. Payne, Castro Valley, Calif.; Joseph S. Hayden, Clarks Summit, Pa.

[73] Assignee: The Regents of the University of California, Oakland, Calif.

[21] Appl. No.: 416,551

[22] Filed: Apr. 3, 1995

[51] Int. Cl.⁶ .................................................. H01S 3/098
[52] U.S. Cl. ................................ 372/18; 372/25; 372/40
[58] Field of Search ................................ 372/18, 25, 40, 372/41

[56] References Cited

U.S. PATENT DOCUMENTS

| | | | |
|---|---|---|---|
| 3,782,828 | 1/1974 | Alfano et al. | 372/18 |
| 3,873,825 | 3/1975 | James et al. | 372/26 |
| 4,048,515 | 9/1977 | Liu | 372/106 |
| 4,059,759 | 11/1977 | Harvey et al. | 372/25 |
| 4,291,282 | 9/1981 | Alfano et al. | 372/18 |
| 4,293,827 | 10/1981 | McAllister et al. | 372/18 |
| 4,371,965 | 2/1983 | Lempicki et al. | 372/40 |
| 4,464,761 | 8/1984 | Alfano et al. | 372/41 |
| 4,803,688 | 2/1989 | Lawandy | 372/21 |
| 4,815,080 | 3/1989 | Chesney et al. | 372/18 |
| 5,182,759 | 1/1993 | Anthon et al. | 372/69 |
| 5,231,533 | 7/1993 | Gonokami et al. | 372/18 |
| 5,341,389 | 8/1994 | Payne et al. | 372/68 |
| 5,425,039 | 6/1995 | Hsu et al. | 372/99 |
| 5,491,708 | 2/1996 | Malone et al. | 372/41 |

OTHER PUBLICATIONS

Hecht; *Understanding Lasers*; IEEE Press; 1994 (No Month); pp. 226–232.

Primary Examiner—Rodney B. Bovernick
Assistant Examiner—Robert E. Wise
Attorney, Agent, or Firm—Henry P. Sartorio

[57] ABSTRACT

An ultrafast laser uses a Nd-doped phosphate laser glass characterized by a particularly broad emission bandwidth to generate the shortest possible output pulses. The laser glass is composed primarily of $P_2O_5$, $Al_2O_3$ and MgO, and possesses physical and thermal properties that are compatible with standard melting and manufacturing methods. The broad bandwidth laser glass can be used in modelocked oscillators as well as in amplifier modules.

17 Claims, 4 Drawing Sheets

ULTRAFAST PULSED LASER UTILIZING BROAD BANDWIDTH LASER GLASS

ULTRAFAST PULSED LASER UTILIZING BROAD BANDWIDTH LASER GLASS

The United States Government has rights in this invention pursuant to Contract No. W-7405ENG-48 between the United States Department of Energy and the University of California for the operation of Lawrence Livermore National Laboratory.

BACKGROUND OF THE INVENTION

1. Field of the Invention

The invention relates generally to generating ultrashort pulses of laser light. The invention relates particularly to the use of specialized gain media in the laser system, in order to generate laser pulses of minimal temporal width. The invention relates most specifically to the use of neodymium-doped phosphate laser glass that offers maximally broadened emission bandwidths, so as to allow for the generation of minimally short pulses of laser light.

2. Description of Related Art

It was first recognized that neodymium-doped (Nd) glass could serve as a laser material several decades ago (E. Snitzer, "Optical Maser Action in Barium Crown Glass," *Physical Review Letters* 7, 444 (1961)). The Nd:glass must be energized with a pump source, such as a flashlamp, laser diode, or other laser, so that the material exhibits gain near 1054 nm. In this way it is possible to amplify light input to the gain medium, or to generate a laser beam by situating the gain medium in an oscillator. Following the recognition that Nd:glass was a useful gain medium, the modelocked Nd:glass oscillator was reported. (A. J. DeMaria, D. A. Stetser, and H. Heynau, "Self-Mode-Locking of Laser with Saturable Absorber," *Applied Physics Letters* 8, 174 (1966)). Here, a train of about a hundred pulses is obtained, such that each individual pulse is about 10 psec long. This concept of modelocking flashlamp-pumped Nd:glass lasers with a saturable absorber proved to be of great interest to the scientific community, (for example, see M. A. Duguay, J. Hansen, and S. L. Shapiro, "Study of the Nd:glass Laser Radiation," *IEEE Journal of Quantum Electronics* 6, 725 (1970); A. Laubereau and W. Kaiser, "Generation and Applications of Passively Mode-Locked Picosecond Light Pulses," *Opto-Electronics* 6, 1 (1974)). While this early method was both simple and inexpensive in that only a saturable absorber dye was needed, the laser output tended to be unstable and the use of the dye was problematic in some circumstances. Many alternative methods of modelocking solid state lasers were examined, although the so-called self-modelocking technique proved to be of the greatest interest, in part because it was possible to generate pulses with sub-picosecond duration (for example, see W. Sibbett, R. S. Grant, and D. E. Spence, "Broadly Tunable Femtosecond Solid State Laser Sources," *Applied Physics B* 58, 171 (1994)). The specific adaptation of generating femtosecond-duration pulses with Nd:glass was pursued by Keller et al. (U. Keller, T. H. Chinn, and J. F. Ferguson, "Self-Starting Femtosecond Mode-Locked Nd:glass Laser that Uses Intracavity Saturable Absorbers," *Optics Letters* 18, 1077 (1993)), who demonstrated the generation of 130 fsec pulses from a laser-pumped Nd:glass system. Other workers have recognized the value of employing laser diodes as the pump source for a modelocked Nd:glass system (U.S. Pat. No. 4,951,294, Basu et al.). The prior art appears to be concerned with the preferred means of modelocking Nd-doped glasses and other gain media by way of improved techniques and cavity arrangements, while the present invention relates to the preferred types of Nd:glass that will minimize the output pulsewidth of the laser oscillator.

The pulse duration and spectral width of the output from a modelocked laser are fundamentally constrained by the relationship:

$$\Delta v \cdot \Delta \tau > 0.3$$

where $\Delta v$ is the full-width-at-half-maximum (FWHM) of spectral bandwidth in $s^{-1}$ and $\Delta \tau$ is the temporal FWHM in seconds. As a consequence of this relationship, gain media that offer a broader emission spectrum can generally be configured to generate shorter pulses in a modelocked oscillator. On this basis alone, Nd-doped silicate glasses would be preferred over phosphate glasses because they have greater emission bandwidth. Silicate glasses, however, are not commonly employed today because it is not possible to melt these types of materials such that they are free of platinum inclusions using existing manufacturing methods. The platinum inclusions tend to have a very low optical damage threshold, rendering the silicate glasses to be somewhat less desirable for use in lasers, while it turns out that it is generally feasible to completely eliminate the inclusions from phosphate-based glasses. It is for these reasons that a Nd-doped phosphate glass that offers maximal spectral width would produce the advantage of the generation of shorter output pulses in a modelocked oscillator.

The first Nd-doped phosphate laser glass patents focused solely on the composition of the material (U.S. Pat. No. 3,250,721, DePaolis et al.), although subsequent patents tended to become more specialized so as to meet the objectives of certain types of lasers. For example, Deutschbein et al., disclose phosphate laser glass compositions having small expansion coefficients and negative dn/dT values (i.e., the change in refractive index versus temperature) in order to devise athermal laser glasses that offer reduced thermal lensing (U.S. Pat. No. 4,022,707). U.S. Pat. No. 3,979,322 by Alexeev et al., also acknowledges the significance of dn/dT as well as the stimulated emission cross section $\sigma_{em}$, and claims various phosphate glass compositions suitable for Nd-lasers. Other patents disclose the appropriate compositions that allow for reduced glass transition temperature (U.S. Pat. No. 4,996,172 by Beall et al.); improved thermal shock resistance and suitable laser-optical properties (U.S. Pat. No. 4,820,662 by Izumitani et al., U.S. Pat. No. 4,929,387, by Hayden et al., U.S. Pat. No. 5,053,165 by Toratani et al.,); water durability devitrification tendencies as well as favorable laser-optical properties (U.S. Pat. No. 4,075,120 by Myers et al.,); chemical strengthening techniques (U.S. Pat. No. 5,164,343 by Myers); athermal behavior (U.S. Pat. No. 4,333,848 by Myers et al.); and concentration quenching (U.S. Pat. No. 4,371,965 by Lempicki et al. and 4,470,922 by Denker et al.). The aforementioned patents are cases where glass compositions were tailored to offer properties favorable for laser operation. In none of these cases was the emission bandwidth called out as a significant quality with respect to laser performance.

There are, however, several patents that are more closely related to the present invention. For example, the composition of the present glass is explicitly noted in U.S. Pat. No. 5,032,315 by Hayden et al. The current invention, however, relates to the use of this particular type of Nd:glass in a laser system designed to generate or amplify ultrashort pulses of light, where the gain medium was selected to provide a particularly broad emission bandwidth. The relationship between laser glass properties and the capability of generating ultrashort pulses was considered in U.S. Pat. No. 4,239,645 by Izumitani et al., although it was solely considered on the basis of the nonlinear refractive index, $n_2$, of the material. The importance of the Nd emission bandwidth $\Delta\lambda_{em}$ was explicitly mentioned in two patents. In U.S. Pat. No. 4,661,284 by Cook et al., $\Delta\lambda_{em}$ was specifically recognized although the intent was to identify glasses where its magnitude was minimized. In U.S. Pat. No. 5,173,456, a preferred embodiment was that $\Delta\lambda_{em}$ be in the range of 27.0–30.5 nm. The utility of the glass was described to be that of providing enhanced bandwidth of the laser output in order to reduce the coherence of the beam. The present invention is intended to relate to the use of certain preferred types of laser glasses in an ultrashort pulse laser.

In view of the keen interest in devising lasers that can deliver ever shorter pulses, in concert with the capability of tailoring the properties of phosphate glasses to meet certain requirements, the object of the current invention is to link these two situations in order to devise an improved means of generating the shortest possible laser pulses.

SUMMARY OF THE INVENTION

Accordingly, it is an object of the invention to provide an improved means of generating or amplifying ultrashort pulses of laser light by using a Nd-doped phosphate glass having optimized emission properties.

It is a further object of the invention to employ a Nd-doped phosphate glass offering an emission bandwidth of >(29–30.5) nm for generating or amplifying ultrashort pulses of light.

It is a further object of the invention to generate or amplify pulses of light having duration <(0.2–100) psec.

It is an additional object of the invention to utilize laser diodes as a pump source for the laser systems noted above.

The present invention entails the means of generating or amplifying ultrashort light pulses by utilizing a Nd-doped phosphate laser glass having a broad emission bandwidth as the preferred gain medium. The invention involves the recognition that certain Nd-doped phosphate glasses can offer wide emission bandwidths, while possessing favorable properties with respect to the "manufacturability" or "meltability" of the glass composition (e.g., stability against devitrification, water durability, free of stria and platinum inclusions, etc.). The embodiment of the invention includes the use of the Nd-doped phosphate glass in an ultrashort pulse laser oscillator or amplifier.

DETAILED DESCRIPTION OF THE INVENTION

Figure 1:
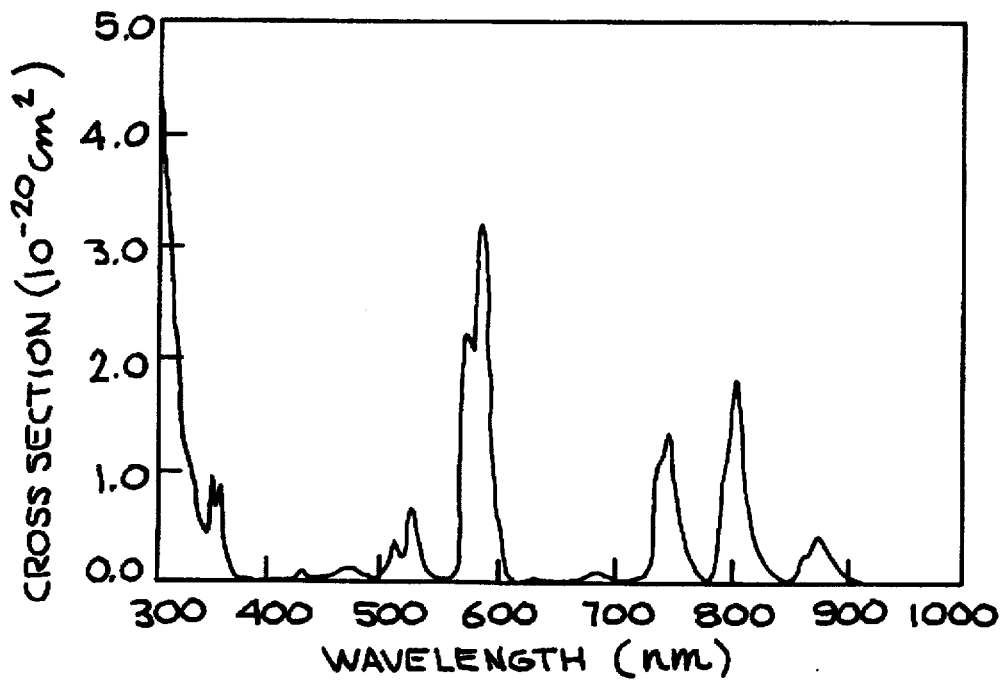
FIG. 1 shows the absorption spectrum of the Nd-doped phosphate glass at room temperature.

The absorption spectrum of the preferred Nd-doped phosphate glass (hereafter referred to as "APG-t") pictured in FIG. 1 provides guidance in regard to the appropriate means by which to energize, or pump, the laser glass. Since the Nd dopant ion gives rise to numerous absorption bands throughout the infrared-visible-ultraviolet region, the laser glass can be pumped by white light generating flashlamps. In addition, monochromatic pump sources may be utilized such as diode lasers at 801 or 880 nm, argon-ion lasers at 514 nm, dye lasers operating at 580 nm, and other sources. As a consequence of rapid internal relaxation processes, light energy absorbed by any of the features shown in FIG. 1 lead to the same luminescence band.

Figure 2:
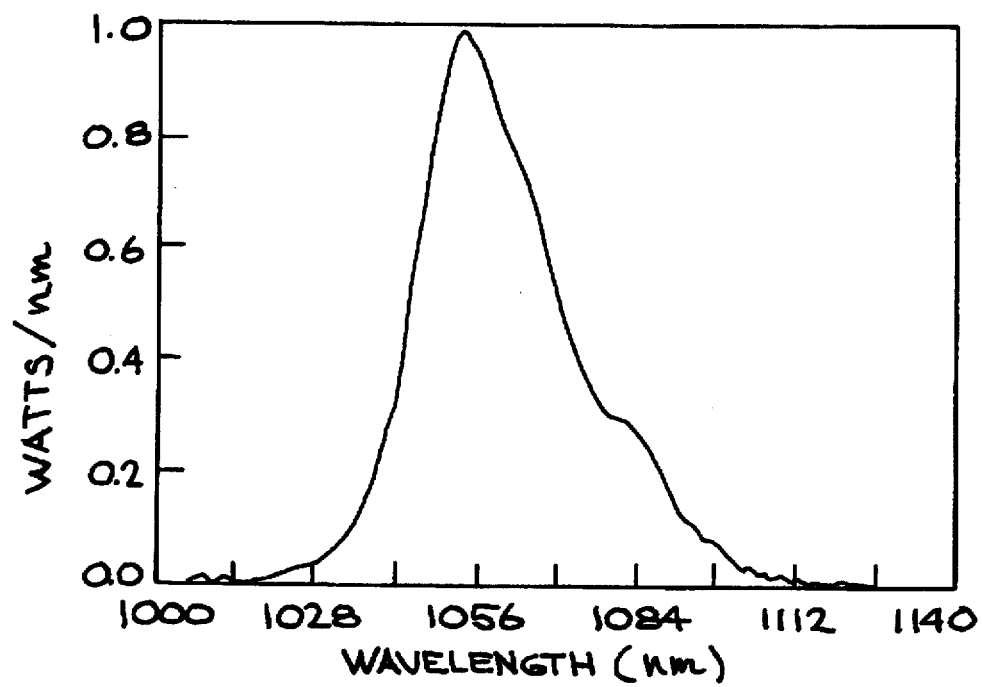
FIG. 2 displays the emission spectrum of the Nd-doped phosphate glass at room temperature; the gain peak occurs at 1054 nm.

The main $Nd^{3+}$ luminescence band employed in lasers is pictured in FIG. 2. While Nd also emits into two other emission bands near 900 nm and 1300 nm, it is the emission near 1054 nm that is routinely exploited in most laser systems. The spectroscopic properties shown in FIGS. 1 and 2 are characteristic of the Nd-doped glass, APG-t, comprised predominantly of $P_2O_5$, $Al_2O_3$ and MgO, although additional small amounts of other cations are required to stabilize the melt and improve the "manufacturability" of the glass.

The highly ionic $Al^{3+}$ and $Mg^{2+}$ constituents lead to substantial broadening of the Nd absorption and emission properties. The tendency for Al and Mg containing glasses to offer the broadest emission bandwidths is evidenced by the data in FIG. 3, where it is apparent that the substitution of Li by Mg (while keeping other components constant) leads to enhanced spectral bandwidths. The Al and Mg containing glasses can be melted and processed under prevailing methods and techniques. The $P_2O_5$-$Al_2O_3$-MgO glasses appear to be consistent with those media offering the broadest possible emission bandwidth while being compatible with conventional phosphate glass melting technology.

Figure 3:
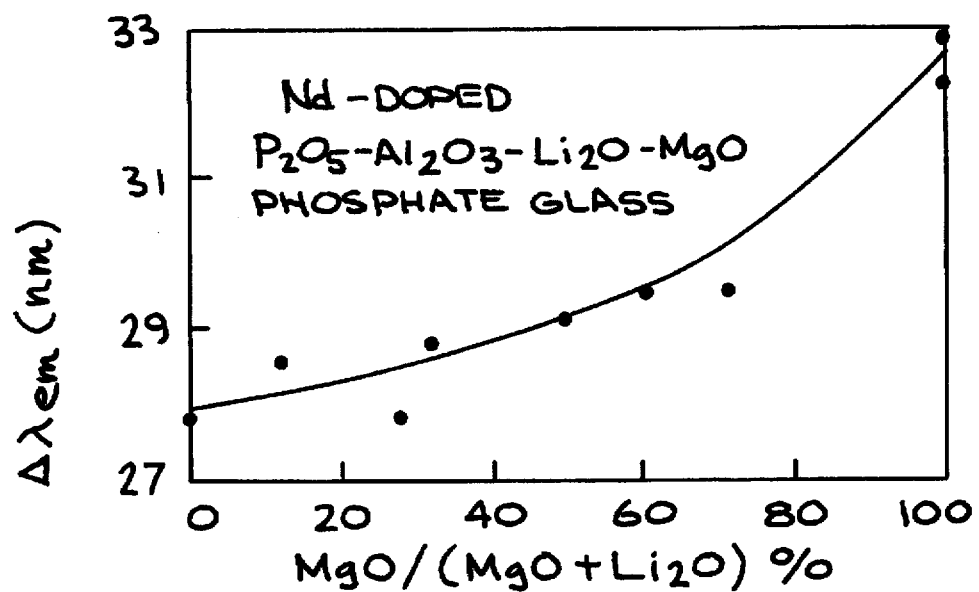
FIG. 3 illustrates the dependence of the emission bandwidth on the relative content of $Li_2O$ and $MgO$ in the phospho-aluminate ($P_2O_5$-$Al_2O_3$) glass matrix.
Figure 4:
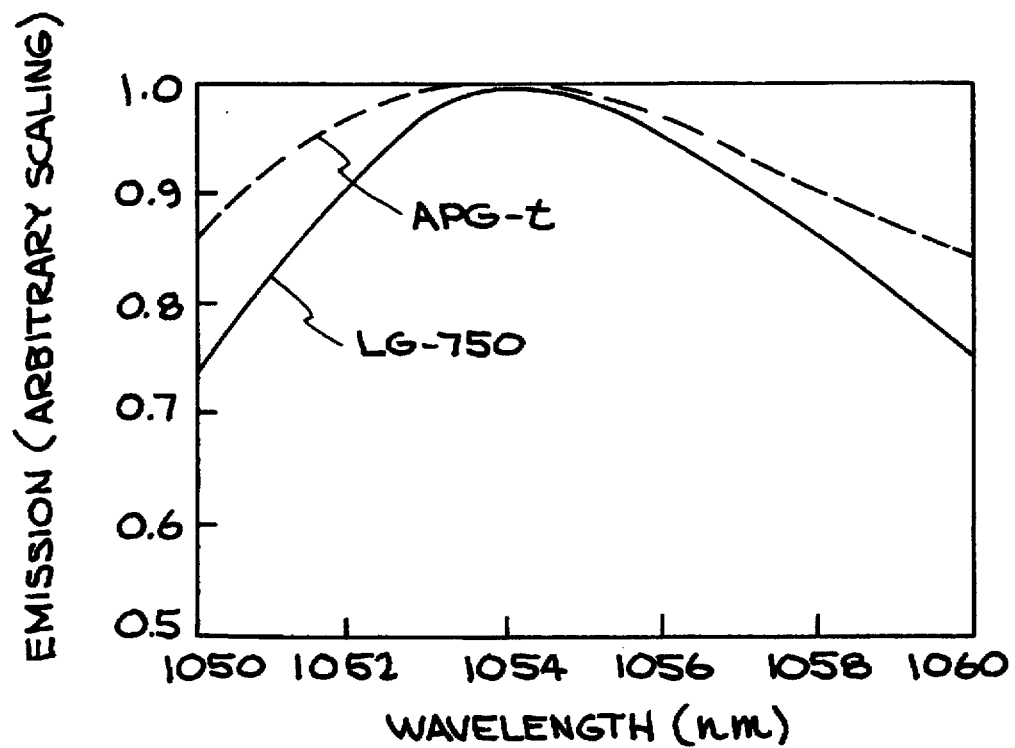
FIG. 4 provides a comparison of the emission band shape near the peak for the LG-750 commercial glass and the new broad-bandwidth glass (referred to as APG-t).

While the data of FIG. 3 suggest that the emission bandwidth, $\Delta\lambda_{em}$, changes from 28 to 33 nm (17%) upon replacing the $Li_2O$ component with MgO, the details of the shape near the emission peak, as pictured in FIG. 4, make clear that the effect of the increased bandwidth is somewhat more pronounced. For example, evaluating the expected laser spectral width on the basis of the points at which the gain drops to 90% of its peak value (see FIG. 4), the increase in bandwidth for APG-t, compared to a typical commercial glass (LG-750), is >40%. On the basis of the relation that $\Delta\nu\cdot\Delta\tau=0.3$ for the laser pulse (discussed above), the LG-750 glass can then generate a pulse of 0.21 psec in duration, while APG-t can support a shorter pulsewidth of 0.14 psec. This decrease in pulsewidth will be regarded as significant for applications where the peak intensity is a crucial parameter. Possible applications include plasma physics studies and tissue ablation in medicine.

Figure 5:
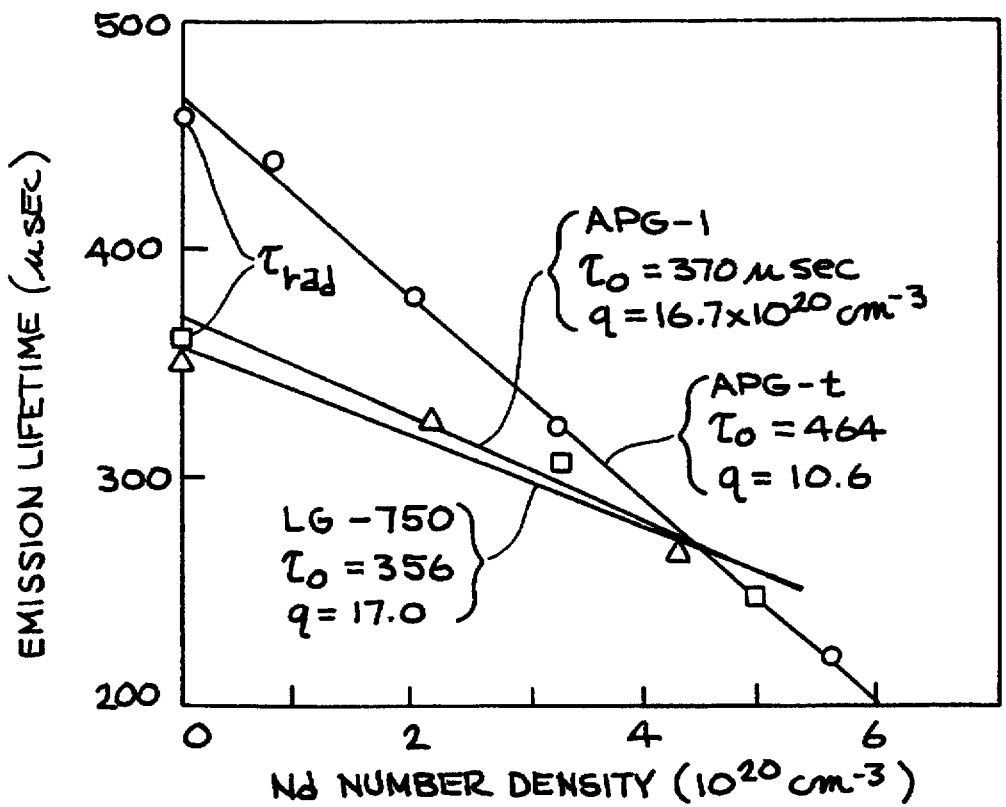
FIG. 5 indicates how the emission lifetime of several Nd-doped phosphate glasses change as a function of Nd dopant content.

FIG. 5 contains a plot of the measured emission lifetime as a function of Nd concentration for the broad bandwidth glass APG-t, and for the two commercial glasses LG-750 and APG-1. The data has been fit to the simple empirical expression $$\tau_{em} = \tau_0 \left[ 1 - \frac{N_{Nd}}{q} \right]$$

where $\tau_{em}$ is the emission lifetime, $N_{Nd}$ is the Nd concentration, and $\tau_0$ and q are fitted parameters. For APG-t, $\tau_0$=464 μsec, while it is in the range of 356–370 μsec for the other glasses. This data would suggest that APG-t offers the potentially important advantage at low Nd doping of providing a longer lifetime, allowing for an enhanced level of energy storage. This advantage is most worthwhile for cases where the pump sources are expensive, as for laser diodes. In other words, the long lifetime permits greater energy storage in the gain medium by way of a longer pumping time, thereby requiring a reduced bank of laser diode pump sources to achieve the specified energy storage density.

Figure 6:
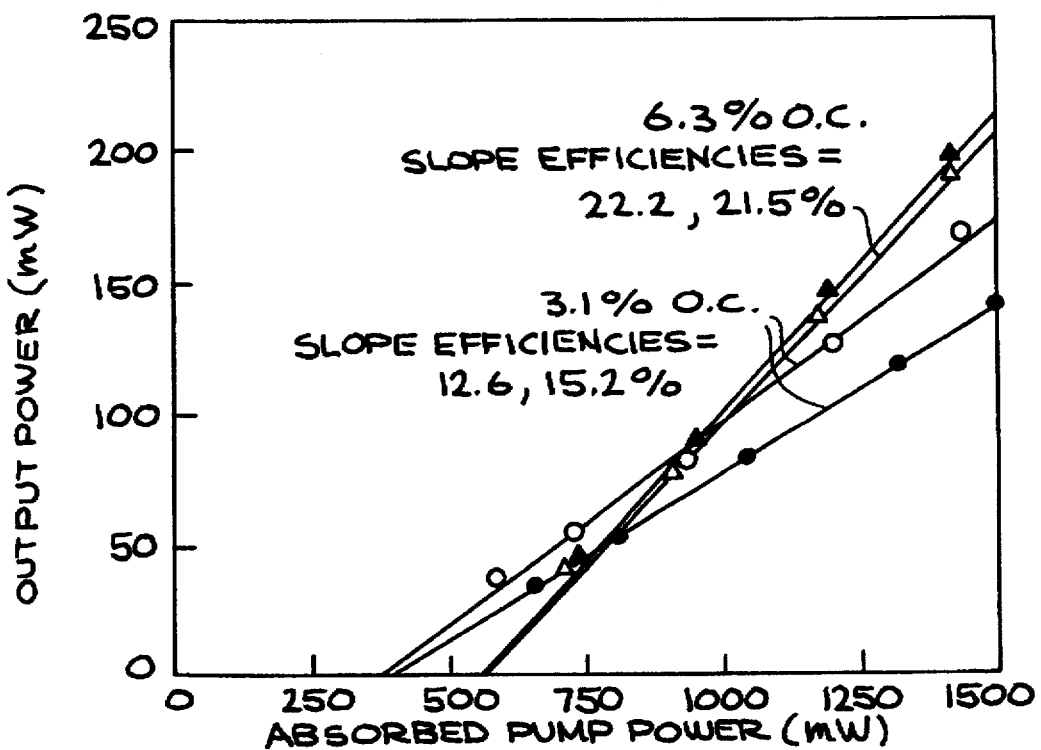
FIG. 6 contains plots of the output power from the Nd-doped phosphate glass oscillator at a function of the power delivered by the pump beam.

In order to provide a straightforward demonstration of laser action from the Nd-doped phosphate glass of interest, the Nd:glass was centered between two 5 cm radius of curvature mirrors (separated by 10 cm) and a 514 nm argon-ion laser was used as the (longitudinal) pump source. The results are shown in FIG. 6, where the instantaneous output power is plotted against the absorbed pump power. Slope efficiencies in the range of 12–22% were attained using output coupling (transmission) values for one laser mirror of 3–6%. The data in FIG. 6 serves to demonstrate that the laser glass type of the invention can function usefully in a standard laser oscillator.

Figure 7:
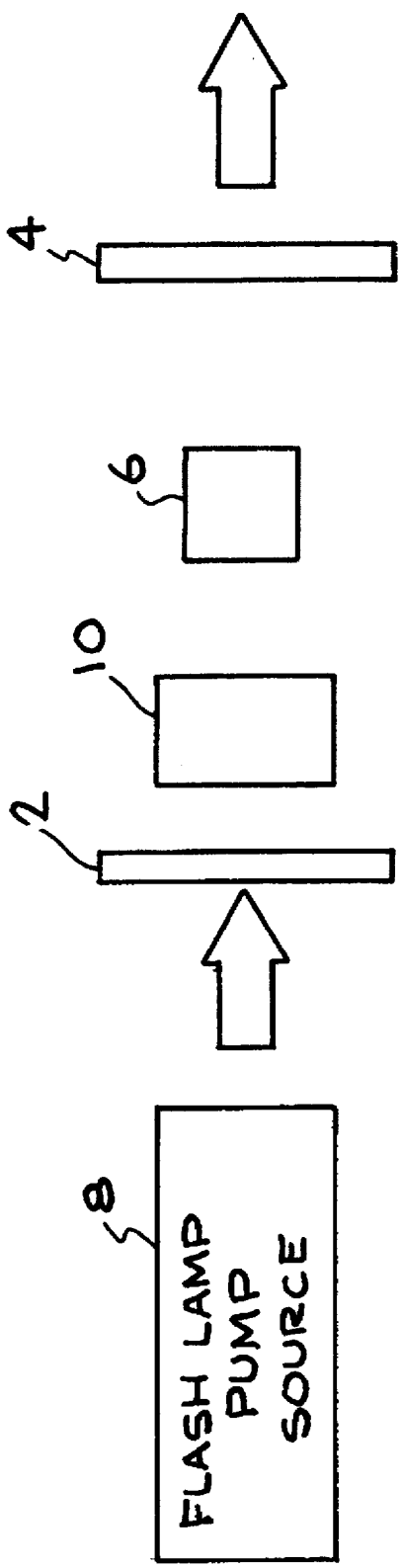
FIG. 7 is a schematic diagram of a modelocked solid state laser oscillator based on the use of a Nd-doped phosphate glass gain medium.

FIG. 7 is a schematic description of the essential optical components in a modelocked laser oscillator, which includes at least two mirrors (2,4); the gain medium (6) comprised of the preferred Nd:glass; a laser or flashlamp pump source (8); and a suitable means of modelocking the laser (10). The modelocking can be accomplished in many different ways, although they can broadly be classified into active and passive methods (depending on whether an externally controlled modulation is imposed on the oscillator, or if it occurs via the interaction of the cavity field with the cavity optics). The most significant recent accomplishment in this field has been of the passive type, where so-called Kerr lens modelocking is used to generate pulses that are <1 psec in duration. The nonlinear focusing of the cavity field is exploited, together with the use of 2 or 4 prisms to remove the impact of chirp on the oscillating pulse. It is often the case that the limiting aspect of an ultrashort pulse laser arises from the gain bandwidth of the laser material and, as a result, the present invention relates to employing state-of-the-art modelocking technology with a suitably devised Nd-doped phosphate laser glass, so as to allow for the generation of the shortest laser pulses feasible. The present invention also relates the use of broad bandwidth laser glasses in amplifiers, wherein the energized gain medium is used to increase the energy of an inputted short pulse of light without undue temporal/spectral distortion.

Changes and modifications in the specifically described embodiments can be carried out without departing from the scope of the invention which is intended to be limited only by the scope of the appended claims.

What is claimed is:

1. In a laser system a Nd-doped phosphate glass gain medium having an emission bandwidth, $\Delta\lambda_{em}$, greater than about 29 nm;
   wherein the phosphate glass is a phospho-aluminate glass containing MgO;
   modelocking means operatively associated with the gain medium to generate or amplify pulses of light having a duration less than about 100 psec.

2. The laser system of claim 1 wherein said gain medium has an emission bandwidth so that the pulse duration is less than about 10 psec.

3. The laser system of claim 1 wherein said gain medium has an emission bandwidth so that the pulse duration is less than about 1 psec.

4. The laser system of claim 1 wherein said gain medium has an emission bandwidth so that the pulse duration is less than about 0.2 psec.

5. The laser system of claim 1 wherein the Nd-doped phosphate glass gain medium has an emission bandwidth, $\Delta\lambda_{em}$, greater than about 30.5 nm.

6. The laser system of claim 5 wherein said gain medium has an emission bandwidth so that the pulse duration is less than about 10 psec.

7. The laser system of claim 5 wherein said gain medium has an emission bandwidth so that the pulse duration is less than about 1 psec.

8. The laser system of claim 5 wherein said gain medium has an emission bandwidth so that the pulse duration is less than about 0.2 psec.

9. The laser system of claim 1 wherein the phosphate glass consists essentially of $P_2O_5$, $Al_2O_3$ and MgO.

10. A laser system comprising:
    a Nd-doped phosphate glass gain medium having an emission bandwidth, $\Delta\lambda_{em}$, greater than about 29 nm;
    wherein the phosphate glass is a phospho-aluminate glass containing MgO;
    modelocking means operatively associated with the gain medium to generate or amplify pulses of light having a duration less than about 10 psec;
    one or more laser diodes for supplying pump power to said Nd-doped glass.

11. The laser system of claim 10 wherein said Nd-doped phosphate glass gain medium has an emission bandwidth greater than about 30.5 nm.

12. The laser system of claim 10 wherein said gain medium has an emission bandwidth so that the pulse duration is less than about 1 psec.

13. The laser system of claim 10 wherein the phosphate glass consists essentially of $P_2O_5$, $Al_2O_3$ and MgO.

14. A method for producing ultrafast laser pulses, comprising:
    providing a laser gain medium comprising Nd-doped phosphate glass having an emission bandwidth, $\Delta\lambda_{em}$, greater than about 29 nm;
    wherein the phosphate glass is a phospho-aluminate glass containing MgO;
    pumping the laser gain medium to produce laser pulses;
    passing the laser pulses through a modelocker to shorten the pulsewidth.

15. The method of claim 14 comprising providing a gain medium with an emission bandwidth greater than about 30.5 nm.

16. The method of claim 14 comprising pumping the laser gain medium with laser diodes.

17. The method of claim 14 wherein the phosphate glass consists essentially of $P_2O_5$, $Al_2O_3$ and MgO.

* * * * *